US011970254B1

(12) United States Patent
Jacobson

(10) Patent No.: US 11,970,254 B1
(45) Date of Patent: Apr. 30, 2024

(54) COLD WEATHER INFANT SURVIVAL SUIT

(71) Applicant: Diego Jacobson, Humacao, PR (US)

(72) Inventor: Diego Jacobson, Humacao, PR (US)

( * ) Notice: Subject to any disclaimer, the term of this patent is extended or adjusted under 35 U.S.C. 154(b) by 422 days.

(21) Appl. No.: 17/456,801

(22) Filed: Nov. 29, 2021

Related U.S. Application Data

(60) Provisional application No. 63/123,655, filed on Dec. 10, 2020.

(51) Int. Cl.
*B63C 9/093* (2006.01)
*A62B 17/00* (2006.01)
*B63C 9/105* (2006.01)

(52) U.S. Cl.
CPC ............ *B63C 9/093* (2013.01); *A62B 17/005* (2013.01); *A41D 2200/20* (2013.01); *B63C 9/105* (2013.01)

(58) Field of Classification Search
CPC . B63C 9/105; B63C 2011/043; A41D 13/012; A41D 13/0125; A41D 2200/20; A41D 2400/12; A62B 17/005
See application file for complete search history.

(56) References Cited

U.S. PATENT DOCUMENTS 3,925,839 A * 12/1975 Smith ..................... B63C 9/093 441/104
4,704,092 A 11/1987 Liukko
6,260,199 B1 * 7/2001 Grunstein ............... B63C 9/093 441/115
6,430,942 B1 8/2002 Pillai et al.
6,706,744 B2 3/2004 Madsen et al.
7,013,489 B1 * 3/2006 McGrath ................ B63C 9/105 2/69
8,632,374 B2 1/2014 Nuñez
2011/0107504 A1 * 5/2011 Nunez ..................... B63C 9/125 2/458
2011/0131700 A1 * 6/2011 Tsui ................... A41D 13/0155 2/93
2011/0177732 A1 7/2011 Clifford
2017/0217119 A1 * 8/2017 Lee ....................... B32B 25/042
2019/0308700 A1 10/2019 Vignola

FOREIGN PATENT DOCUMENTS

RU 79430 1/2009

* cited by examiner

*Primary Examiner* — Andrew Polay
(74) *Attorney, Agent, or Firm* — Luis Figarella

(57) ABSTRACT

A cold weather infant survival suit includes a principal body cavity having infant/baby holding attachments to fit/hold their small bodies and a coverable cranial opening. The structure of the suit includes a layered structure of mechanically interconnected cavities within cavities. A composite of tear-proof and insulation material forms an internal suit or first envelope that is surrounded by a waterproof suit and then by a tear resistant suit.

13 Claims, 13 Drawing Sheets

COLD WEATHER INFANT SURVIVAL SUIT

CROSS-REFERENCE TO RELATED APPLICATIONS

This application claims priority to co-pending U.S. Provisional patent application Ser. No. 63/123,655 titled "Cold Weather Infant Survival Suit", filed on Dec. 10, 2020, the disclosure of which is herein incorporated by reference in its entirety.

PATENTS CITED

The following documents and references are incorporated by reference in their entirety, Wigutow (U.S. Pat. No. 6,06,744), Liukko (U.S. Pat. No. 4,704,092), Clifford (U.S. Pat. Pub. No. 2011/0177732), Vignola (U.S. Pat. Pub. No. 2019/0308700) and Nunez (U.S. Pat. No. 8,632,374).

FIELD OF THE INVENTION

The invention relates to cold weather or artic conditions infant survival comfort clothing, and specifically to cold weather conditions infant survival suits.

DESCRIPTION OF THE RELATED ART

Survival suits and other assistance garments/devices are intended to be used and/or available to operators and passengers of boats/platforms during cold and artic weather. Many of these suits contain insulation/impermeable layers to keep the wearer warm and (if possible) dry, and they may contain a flotation element that provides buoyancy to keep the wearer afloat when in the water. Some also are flame resistant as ship/platform abandonments happen during fires.

Hypothermia can claim a victim's life in less than 15 minutes, leaving no room for error when it comes to the protective qualities of a cold-water immersion suits. While there are many professional garments, these take a long time to put on, usually involve practicing and even the assistance of someone else. A casual user or ship passenger unit, designed for the emergency use of the general population, requires quick donning by an effectively un-trained group of users. As more and more companies offer travel to families to artic/Antarctic destinations, there is a need for protection of infants and small children that are incapable of donning a complete artic suit by themselves.

The situation is even worse when we consider infants (as well as small pets), for these are incapable of fully understanding the situation and must be protected from both the conditions and their own behavior. It is crucial that they be securely held, while providing for their caretaker to have access to both the infant and the suit.

Today's immersion suits are required (per 46 CFR 160.171-17) to maintain body heat for up to 6 hours, to be certified by Underwriters Laboratories, Inc. and as of 2017 to be SOLAS and the International Maritime Organization's (IMO) Maritime Safety Committee (MSC) Life-Saving Appliance (LSA) Code (RESOLUTION MSC.48(66) as amended through Res. MSC.207(81)); evaluated and tested in accordance with Res. MSC.81(70), as amended through Res. MSC.226(82). Identifying Data: 46 CFR 160.171 and UL Report File No. MQ 7228. Additional requirements include ISO 15027-2 for "Immersion Suits—Part 2: Abandonment Suits, Requirements including safety".

All of the above, is further tempered by the acceptance that rescue within that timeframe is never guaranteed. What is needed are improvements in materials combinations and ergonomic design to provide an easier to put on, better heat preserving cold weather infant suit, which delivers on improved survival times (beyond the required 6 hrs., perhaps 12+ hrs.) in both water and on life-raft and icefloes/ice covered surfaces.

SUMMARY OF THE INVENTION

This section is for the purpose of summarizing some aspects of the present invention and to briefly introduce some embodiments. Simplifications or omissions may be made to avoid obscuring the purpose of the section. Such simplifications or omissions are not intended to limit the scope of the present invention.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e., that it will be taken to mean an inclusion of not only the listed components it directly references, but also other non-specified components or elements. This rationale will also be used when the term 'comprised' or 'comprising' is used in relation to one or more steps in a method or process.

In one aspect, the invention is about a flexible cold weather infant survival suit for a user comprising a first inner thermal layer forming a central cavity pneumatically connected to a head covering having a face opening, wherein said thermal layer cavity includes one or more attachment components at various locations of said thermal layer's exterior, wherein said thermal layer comprises an internal lining layer and a thermally insulating bubble layer attached together, wherein said thermal layer bubbles are comprised of similar sized bubbles that have a diameter of between 5 mm and 30 mm and a height of 3 mm to 6 mm, a second waterproof layer dimensioned to envelop said inner thermal layer, said waterproof layer including one or more internal attachment components complementary to said thermal layer's attachment components, so as to couple said waterproof layer together to said inner thermal layer, wherein said waterproof layer is formed from a waterproof material, including a flexible hood having a seal around the user's face area of said thermal layer's head covering, said second layer has one or more front opening/closing mechanical components for sealing the interior of said second layer, including said thermal cavity and said enclosure has a stabilizing wing at the back and upper end. In another aspect said central cavity is equipped with infant securing components, including at least one of: strap, seat, pet restraining hook and/or belt.

In yet another aspect said internal lining materials are comprised of one or more of: ripstop fabric, ripstop nylon, Dyneema®, silnylon or cordura, said thermally insulating materials are comprised of one or more of: bubble layer, bubble layer with foil, radiant foil or aerogel and said waterproof layer materials are comprised of one or more of:

plastic film, polyether film or polyurethane. In another aspect an inflatable head shroud is located around the head opening area. In yet another aspect said stabilizing wing has two underside extensions and one or more straps are placed for ease of holding onto said suit. In another aspect said bubble layers include aluminized layers on their exteriors. In yet another aspect one or more attachment components added to the exterior of said waterproof layer, a third protective outer layer enveloping said waterproof layer, said outer layer including internal attachment components complementary to said waterproof's layer external attachment components, so as to couple said outer layer to said waterproof layer and wherein said outer layer is formed from one or more materials, including wear resistant fibers and mechanical closure components. In another aspect one or more attachment components added to the exterior of said waterproof layer, a third protective outer layer enveloping said waterproof layer, said outer layer including internal attachment components complementary to said waterproof's layer external attachment components, so as to couple said outer layer to said waterproof layer and wherein said outer layer is formed from one or more materials, including wear resistant fibers and mechanical closure components. In yet another aspect said central cavity is equipped with infant securing components, including at least one of: strap, seat, pet restraining hook and/or belt.

In one aspect, the invention is about a survival suit kit comprising: a bag or container with a carry strap, said bag/container containing: a flexible cold weather survival suit for a user comprising: a first inner thermal layer forming a central cavity pneumatically connected to two leg extensions, two arm extensions and a head covering having a face opening, wherein said thermal layer cavity includes one or more attachment components at various locations of said thermal layer's exterior, wherein said thermal layer comprises an internal lining layer and a thermally insulating bubble layer attached together, wherein said thermal layer bubbles are comprised of similar sized bubbles that have a diameter of between 5 mm and 15 mm and a height of 3 mm to 6 mm, a second waterproof layer dimensioned to envelop said inner thermal layer, said waterproof layer including one or more internal attachment components complementary to said thermal layer's attachment components, so as to couple said waterproof layer together to said inner thermal layer, wherein said waterproof layer is formed from a waterproof material, including a flexible hood having a seal around the user's face area of said thermal layer's head covering and said second layer has one or more front opening/closing mechanical components for sealing the interior of said second layer, including said thermal cavity.

Other features and advantages of the present invention will become apparent upon examining the following detailed description of an embodiment thereof, taken in conjunction with the attached drawings, which are provided for purposes of illustration and not of limitation.

Figure 1:
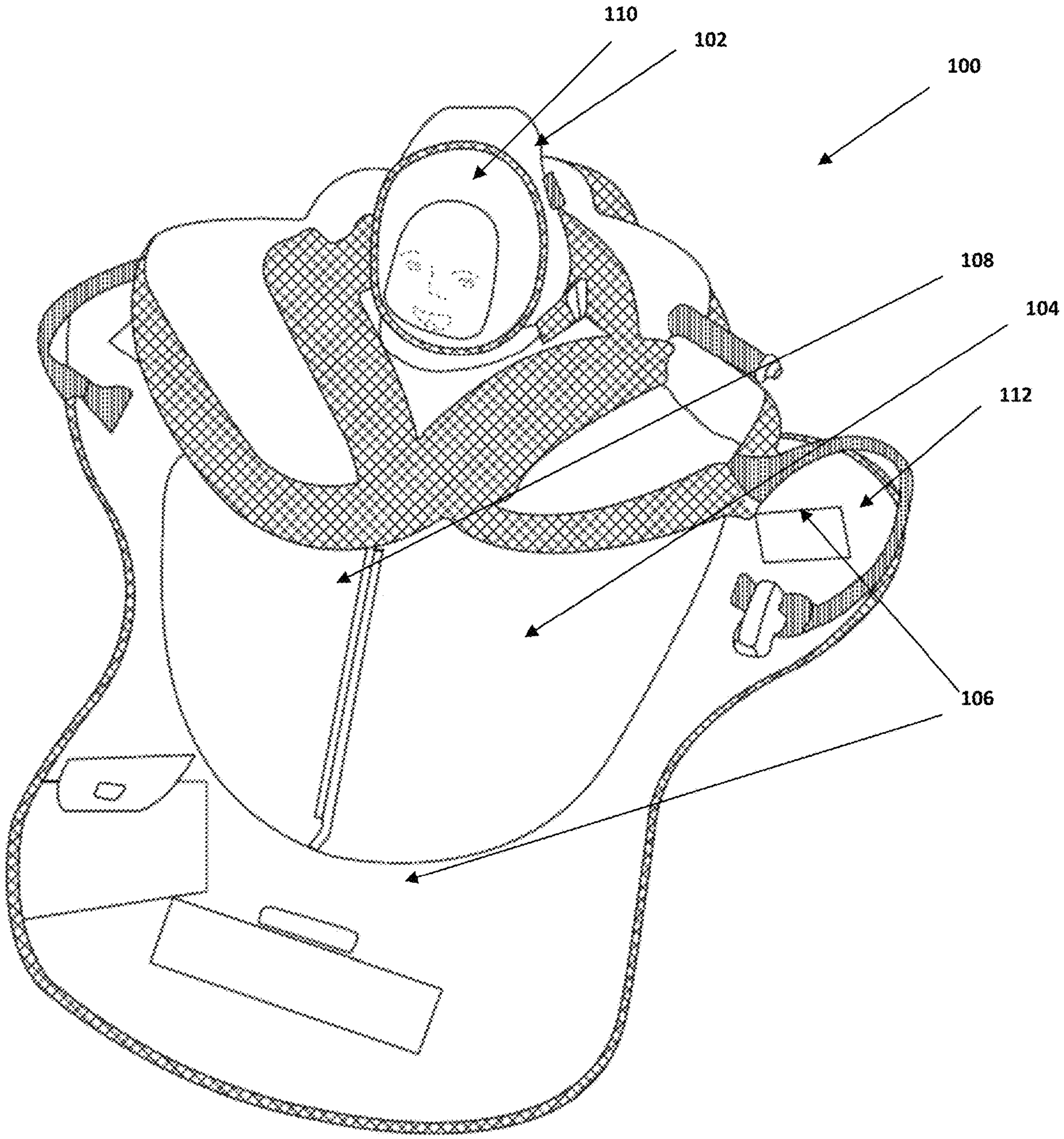
FIG. 1 shows a front perspective of the cold weather infant survival suit, according to an exemplary embodiment of the invention.

The above-described and other features will be appreciated and understood by those skilled in the art from the following detailed description and drawings.

DETAILED DESCRIPTION OF THE INVENTION

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

Referring to FIG. 1 we see an exemplary embodiment of the cold weather or Artic infant survival suit 100 suitable for use by infants/toddlers (as well as by small pets). The suit is made from a fabric comprised of a multi-layered composite fabric 1200 (FIG. 12) and crafted to create a climate resistant enclosure for the infant's body in which it is easy to place and secure the small body of the occupant and close with minimal or no previous training.

The infant suit 100 is comprised of a singular pneumatic internal cavity designed to hold the body (including arms/legs/torso 104) and a connected hood or head cover 102. In one embodiment, two 'arm mittens' 112 serve two purposes. A place for the infant to place the arms, but also a stabilizing wing which has two underside extensions 1202 at the back and upper end of the torso 104 to provide extra stability while the suit floats in water. Both the front 100 and back of the suit may contain one or more high visibility features 106 to facilitate location of the user in open water or ice.

Figure 2:
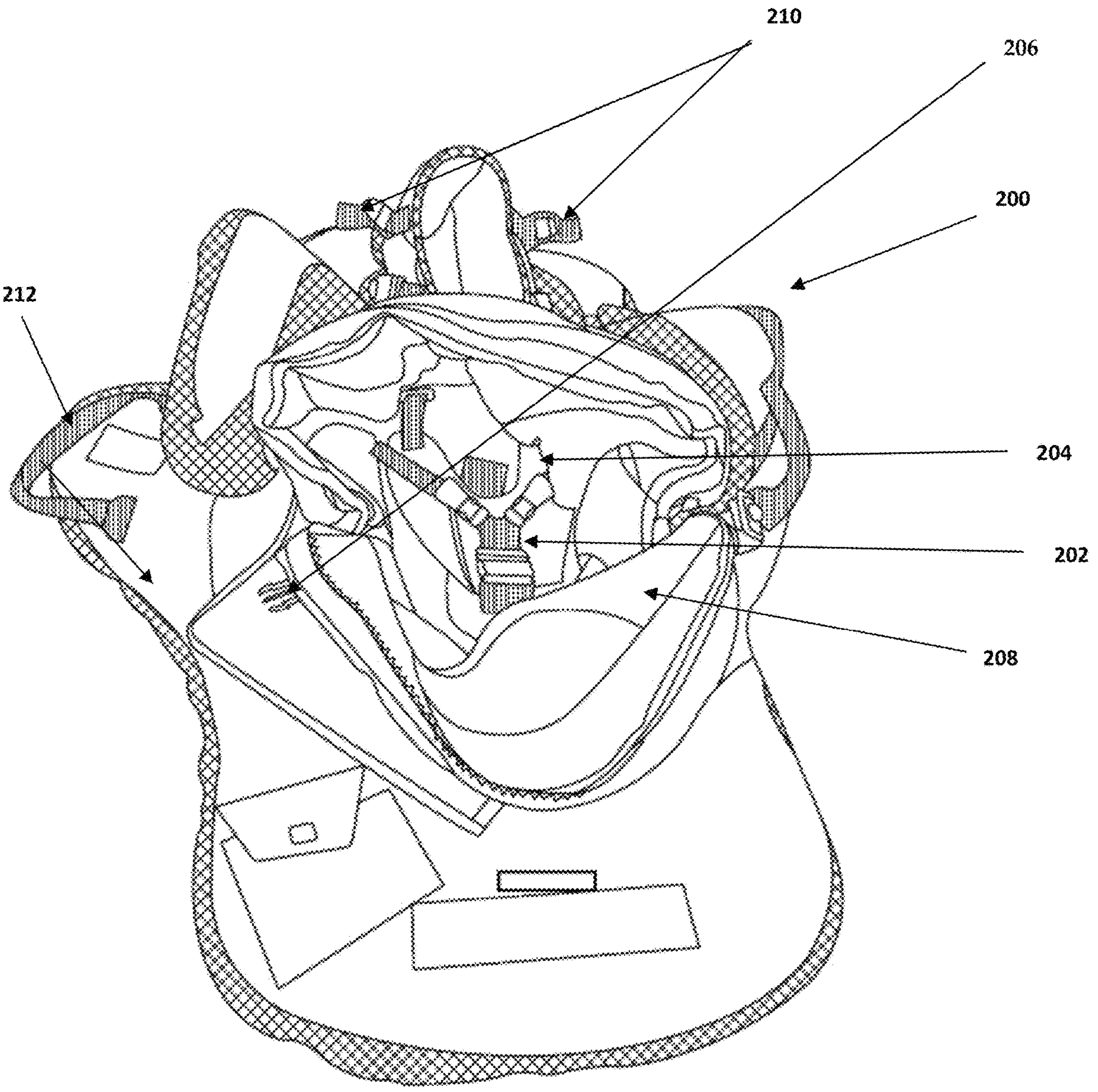
FIG. 2 shows a front perspective view of the cold weather infant survival suit ready for infant insertion, according to an exemplary embodiment of the invention.
Figure 3:
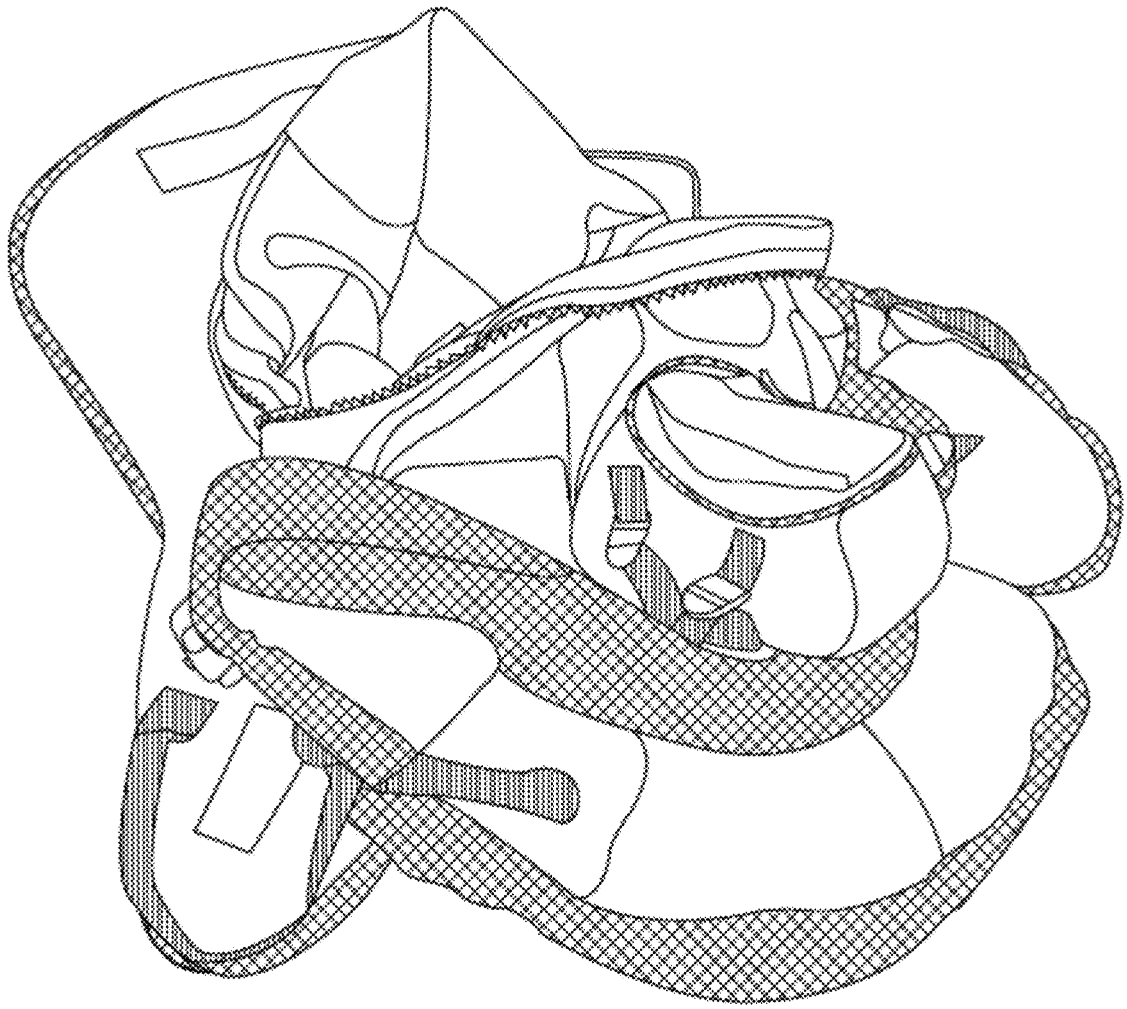
FIG. 3 shows a top perspective view of a partially donned cold weather infant survival suit, according to an exemplary embodiment of the invention.
Figure 4:
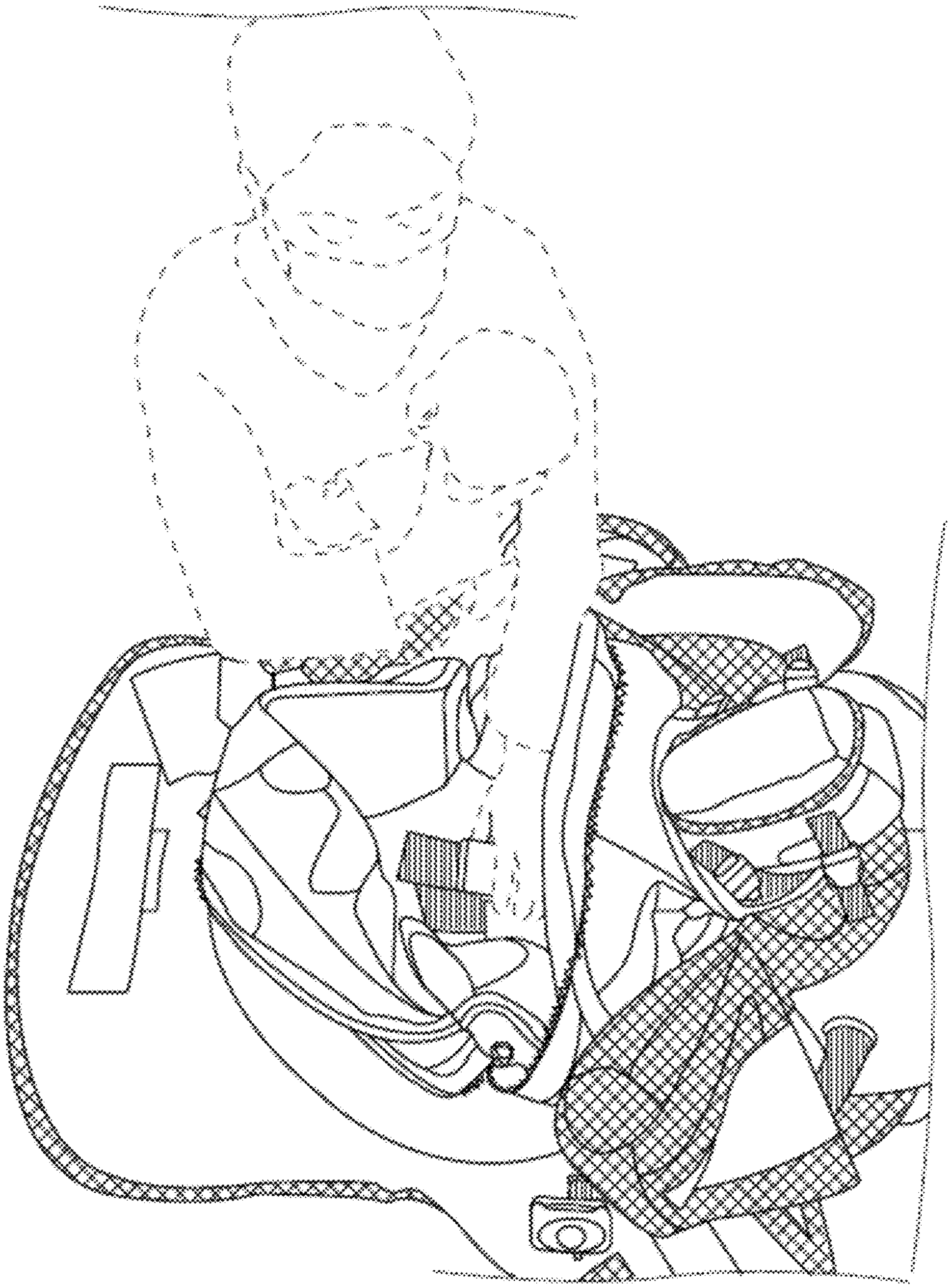
FIG. 4 shows an adult inserting an infant into a cold weather infant survival suit, according to an exemplary embodiment of the invention.
Figure 5:
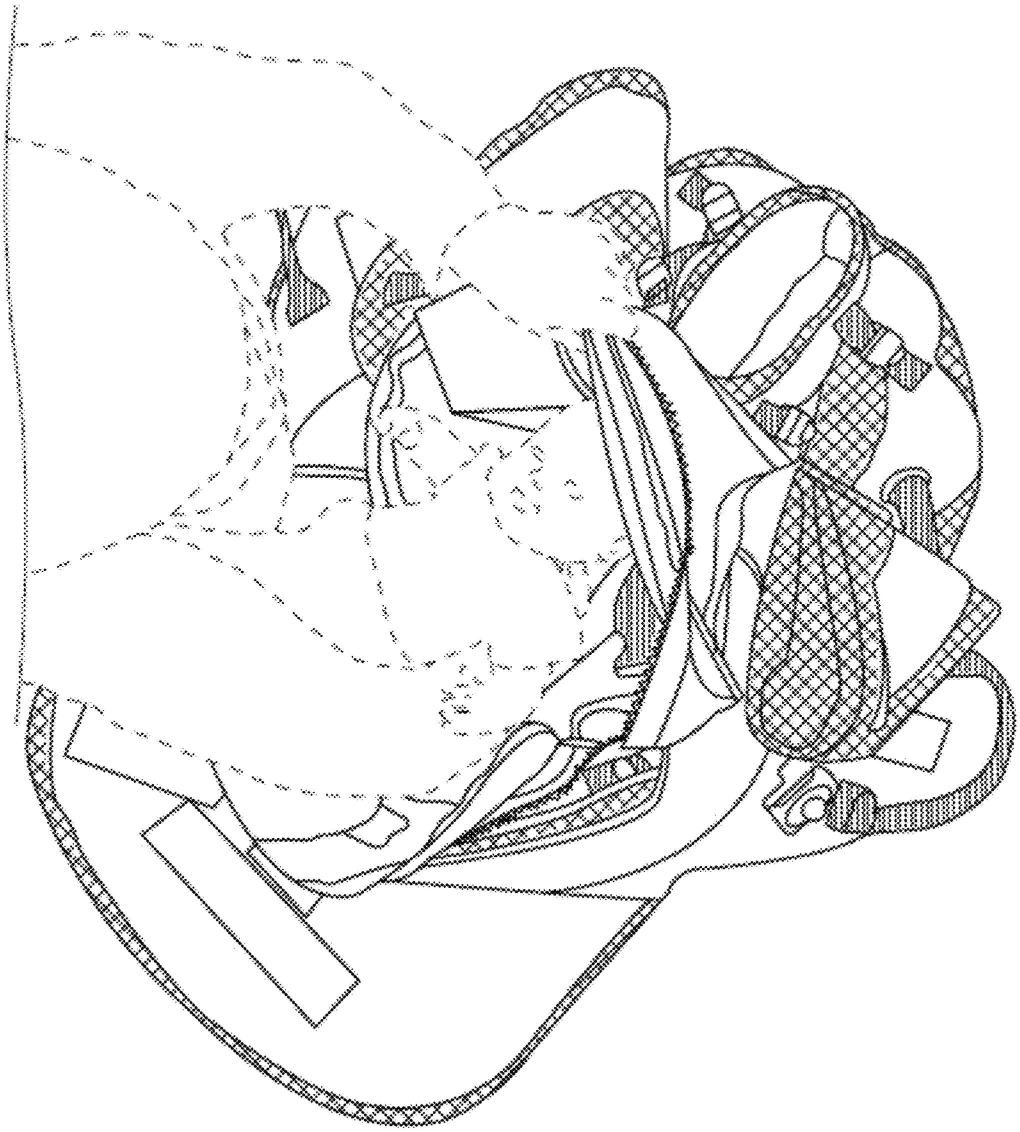
FIG. 5 shows an adult inserting an infant into a cold weather infant survival suit laying on its back, according to an exemplary embodiment of the invention.
Figure 6:
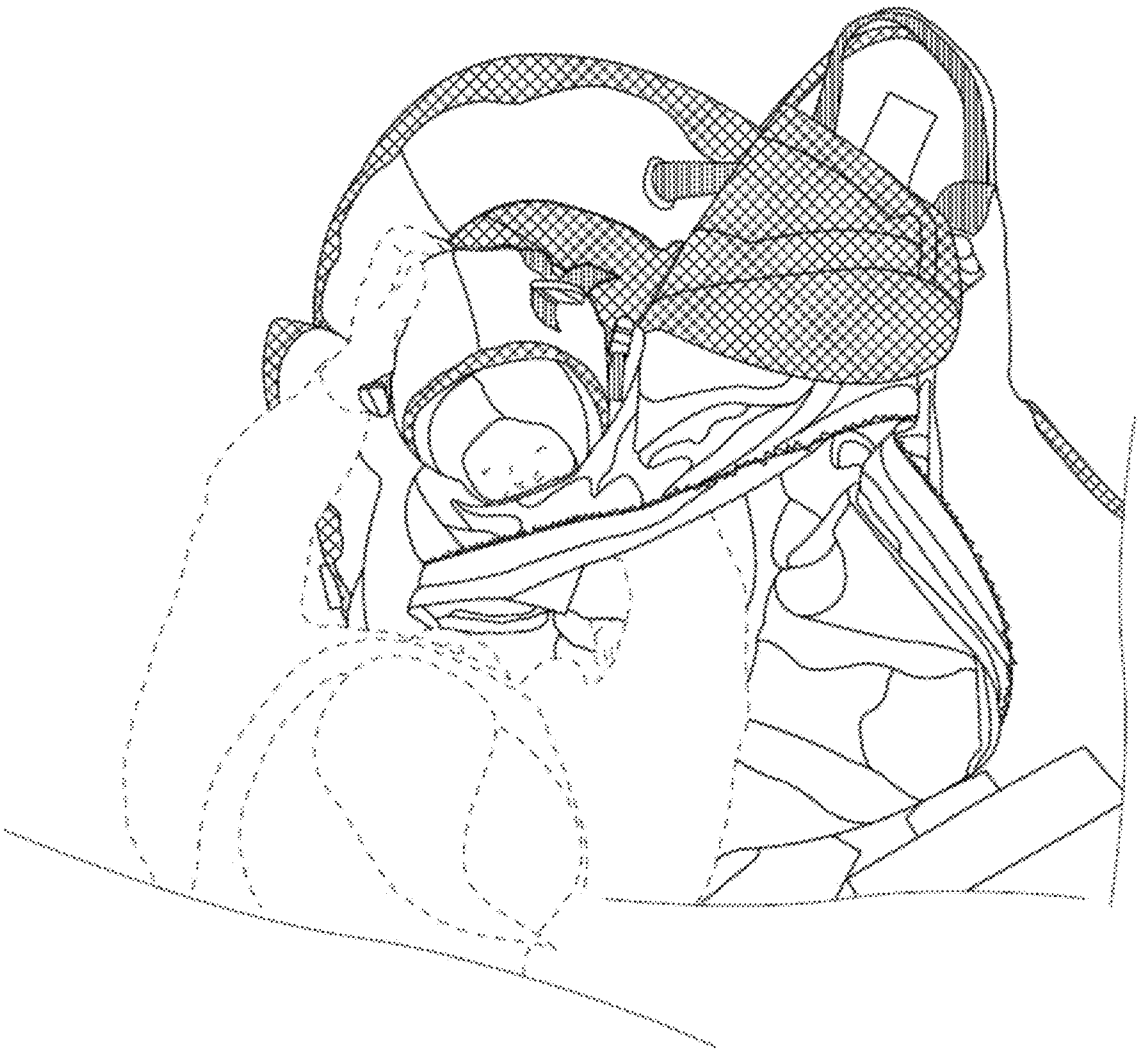
FIG. 6 shows an adult adjusting the hood around an infant within a cold weather infant survival suit, according to an exemplary embodiment of the invention.
Figure 7:
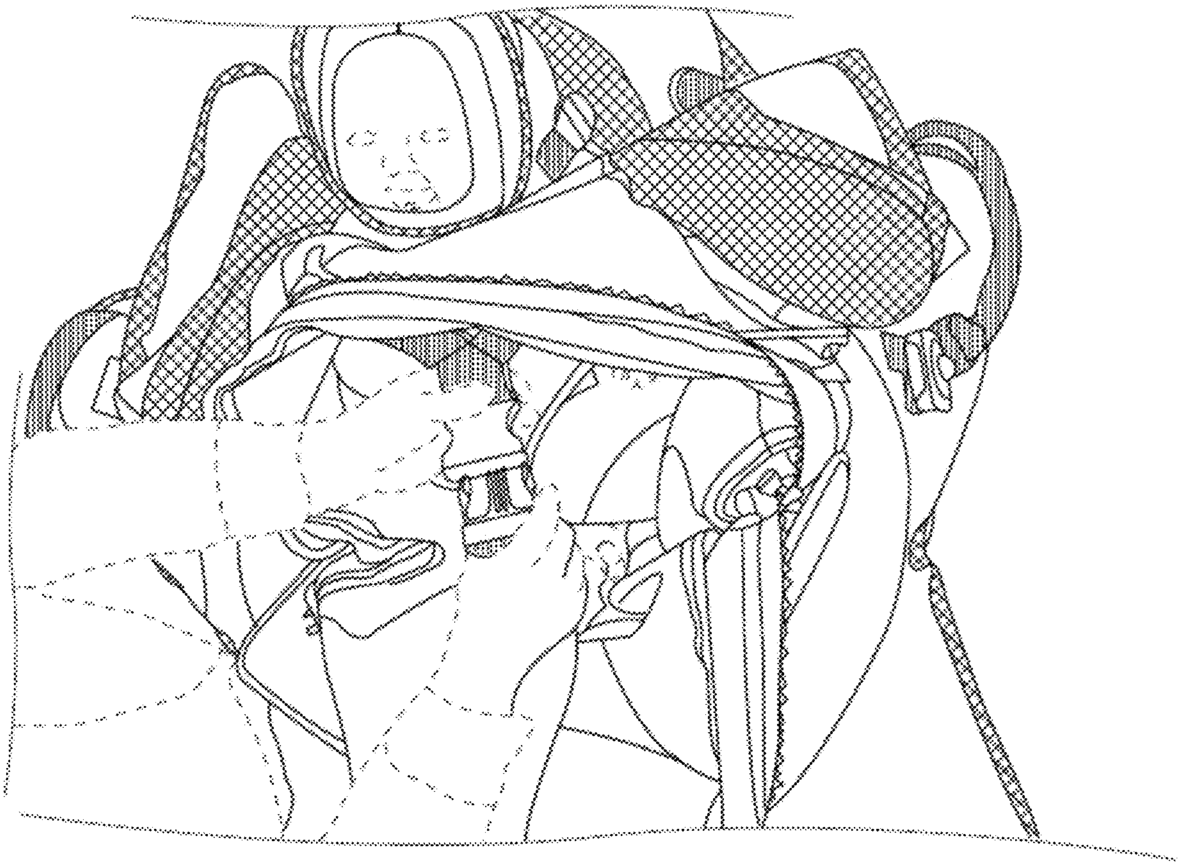
FIG. 7 shows an adult adjusting the infant inside a cold weather infant survival suit, according to an exemplary embodiment of the invention.
Figure 8:
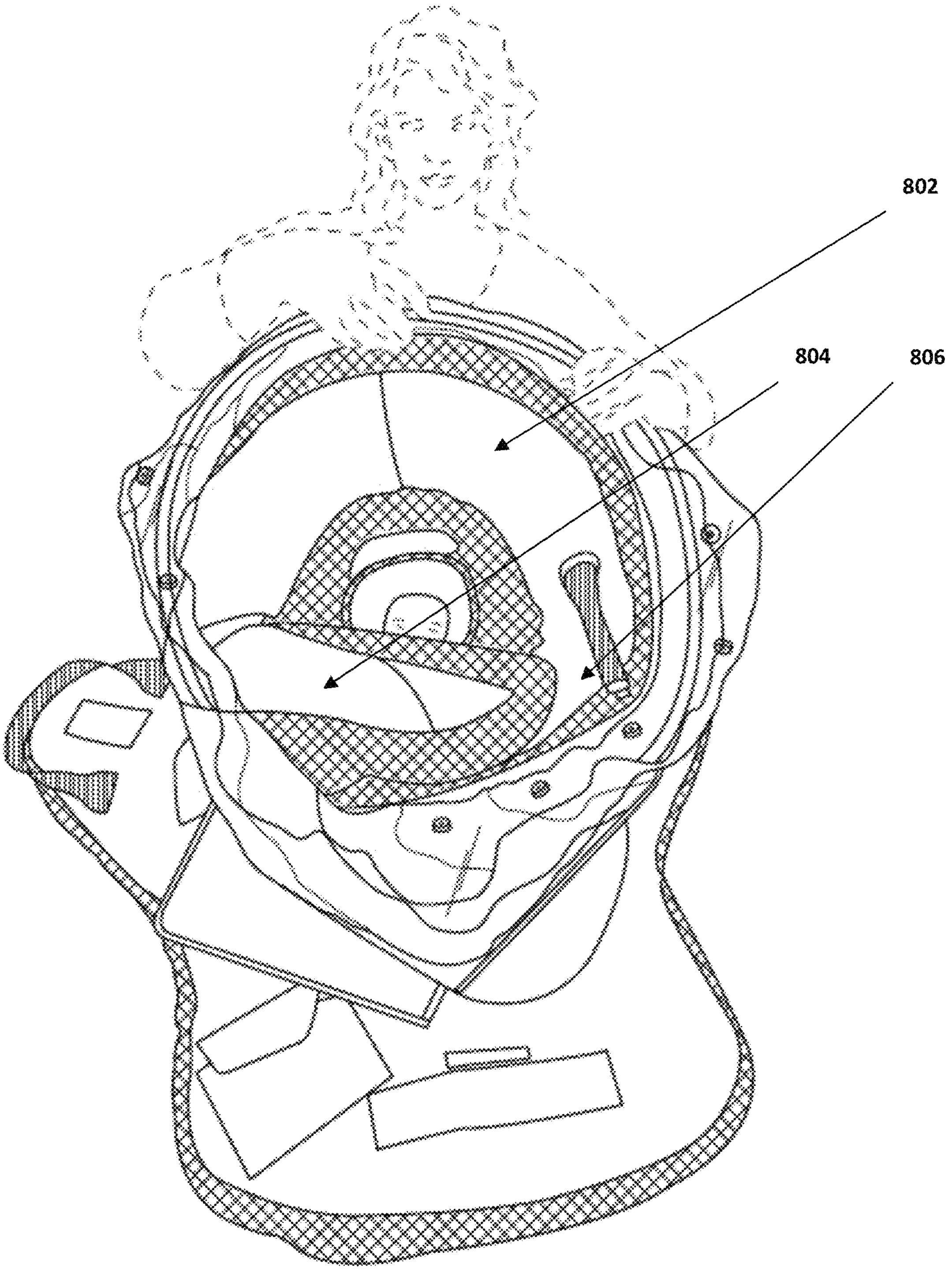
FIG. 8 shows an adult deploying the splash guard of the cold weather infant survival suit, according to an exemplary embodiment of the invention.
Figure 9:
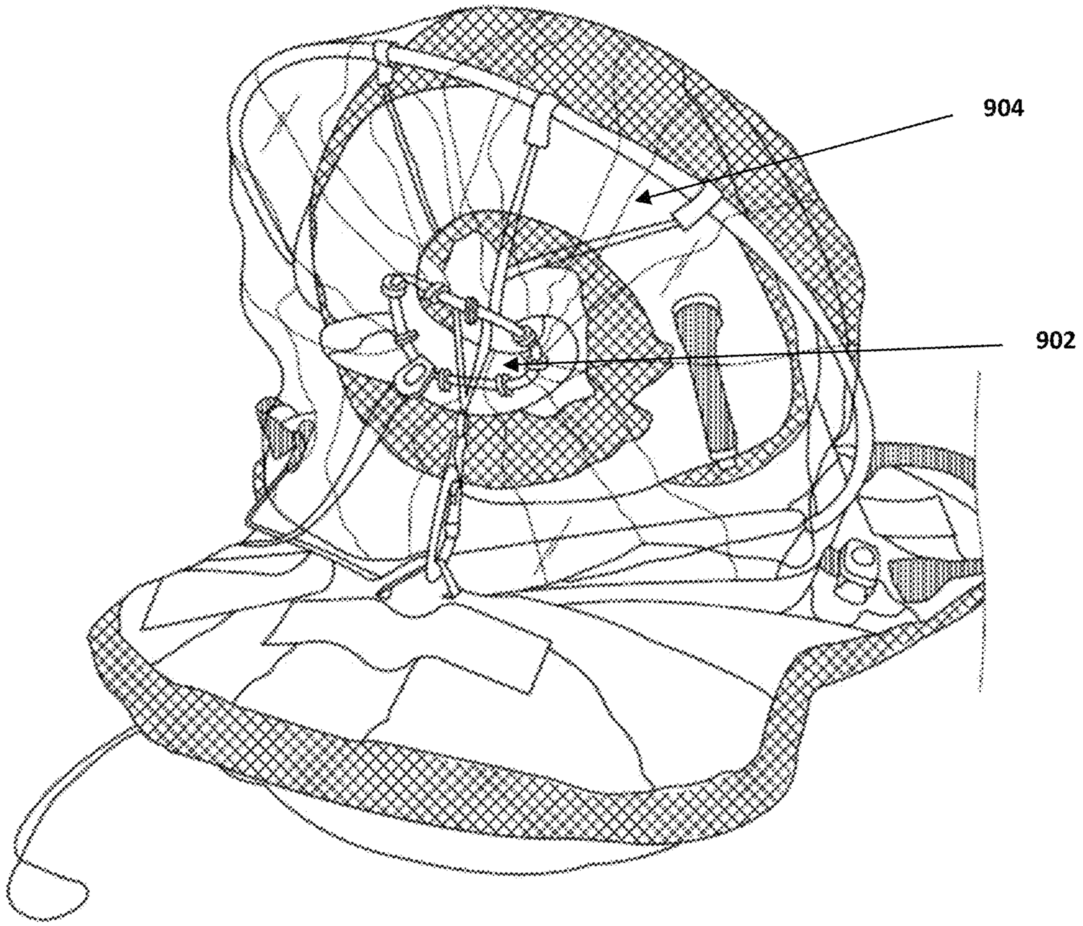
FIG. 9 shows the deployed splash guard of the cold weather infant survival suit, according to an exemplary embodiment of the invention.

As seen in FIGS. 2-3, the addition of internal securing straps 202 holds the infant secure within the internal cavity 204 in combination with a front opening/closing component 206 (said component may be a zipper, hooks and loops (e.g., Velcro™) or other suitable sealing mechanisms) so that water is kept outside the waterproof layer 208 of the suit. One or more straps 212 are placed for the ease of holding by an adult while in the water. Similarly, a hoop/loop may be provided to permanently place a rope to connect the suit 100 to a boat or another adult.

In one embodiment, the suit is built from a composite fabric (FIGS. 12-14), with emphasis on both waterproofing and minimizing heat transfer from the inside (provided by the infant's body within) and the exterior. In one embodiment, 1200, this is accomplished by creating a multi-layer structure that begins with an inner layer 1204, preferably a nylon, more preferably a ripstop nylon or equivalent, placed against the cavity/space 1202 within the suit. Outside this layer, we place a Bubble material layer 1206, comprised of the traditional air captured layers formed into 10 mm diameter bubbles and one or more optional reflective foil covers 1212 (typically an aluminized foil or mylar), preferably the reflective foil cover being applied to one or both surfaces of the one or more layers of bubbles.

Figure 12:
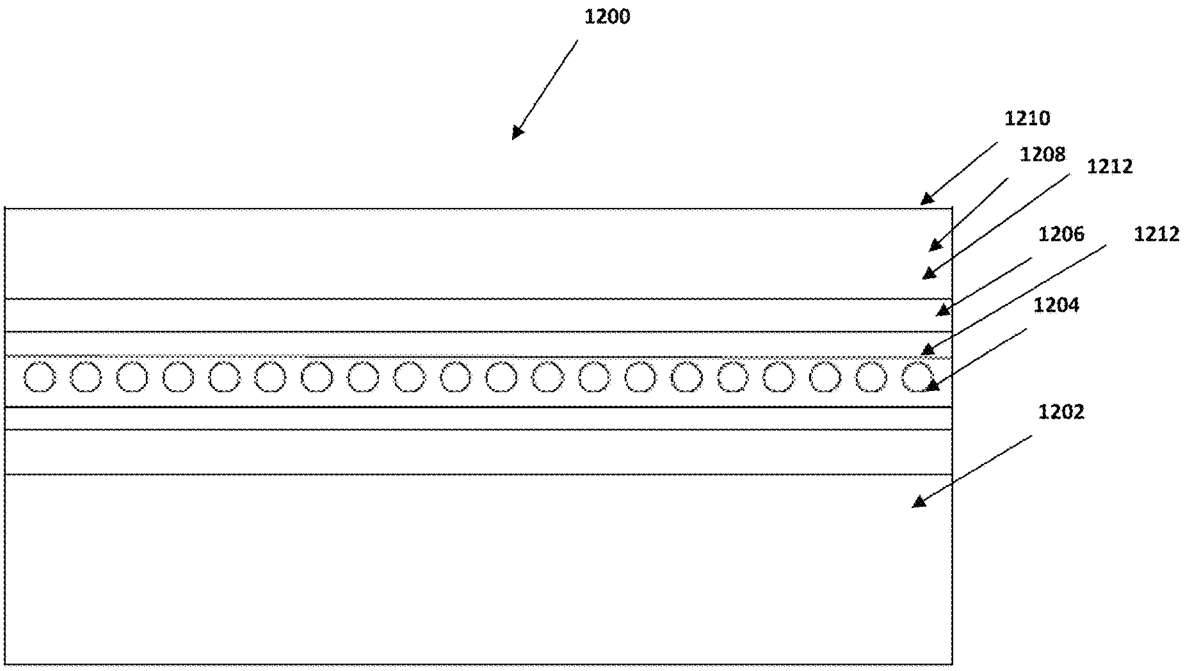
FIG. 12 shows a cross section of the material layers that comprise the various suits when nested within each other for parts of the cold weather survival suit, according to an exemplary embodiment of the invention.
Figure 13:
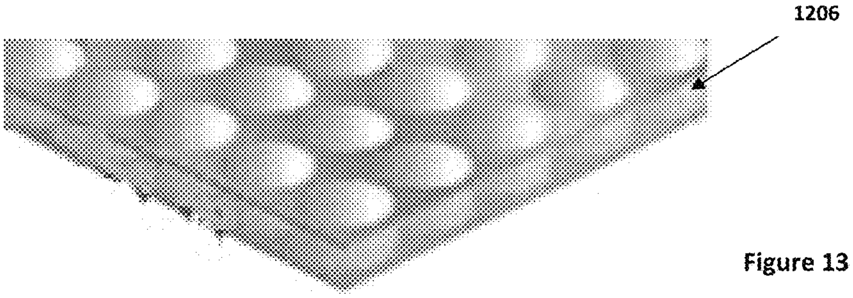
FIGS. 13-14 show two distinct embodiments of the bubble layer of the cold weather suit, according to exemplary embodiments of the invention.
Figure 14:
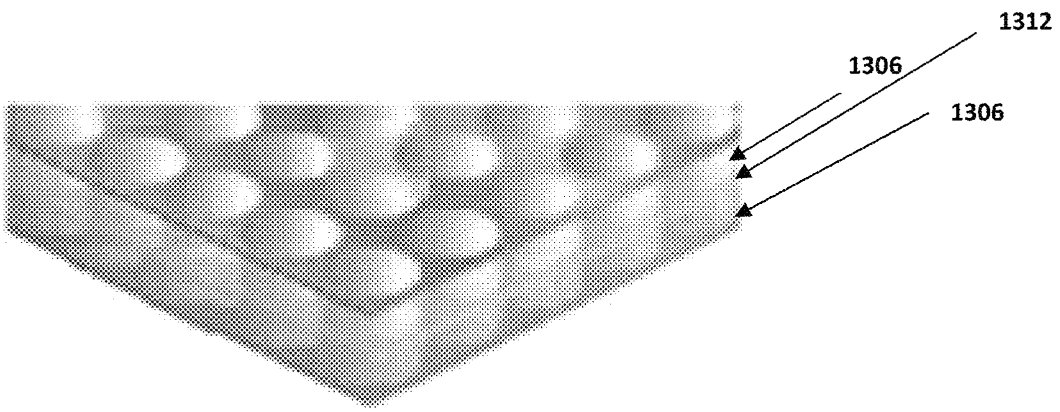

While many configurations and sizes of bubbles are envisioned, in one embodiment, we use a bubble layer 1206 similar to that seen in FIGS. 12-14. In one embodiment, the bubbles form a cylinder of diameter from 5 mm to 30 mm, and height from 3 mm to 6 mm (see as an example TempShield™ Bubbles Foil/White, Radiant Foil, Style TS-SBFW-48). We note that even though the shown shape for the bubbles is a cylindrical one, other suitable shapes includes spheres, squares, rectangles, etc. This bubble material, traditionally used for insulation in construction sites, may be found under the TempShield™ brand as single 1206 or double bubbles as well as the option of a reflective metalized material between them, forming in one embodiment a 3 mm to 6 mm thick material (which may be double or triple or more layered) with bubbles that are in one embodiment 10 mm diameter, but may range from 5 mm to 30 mm diameter. The bubble layer 1206 may be obtained from a supplier such as Radiant Foil. The larger diameter bubbles are possible in the infant suit, as there is less need for arm/leg/torso movement.

The gas bubbles trapped within the bubbles layer 1206 act as an insulating layer, which will minimize the wearer's heat from escaping the inside cavity of the suit where the user lies. The smaller size allows for significant flexibility in wearability. The preferred ripstop nylon layer 1204 is secured, preferably sewn, into the bubble layer 1206 along the edges, significantly improving the seam integrity by forming a composite that resists stretching, while allowing for the wearer's skin/clothing to slide easily with in the pneumatic internal cavity.

In one embodiment, the bubbles in the bubble material layer are all about 10 mm diameter, although other suitable sizes may be used. In one embodiment, we use them with a diameter of from 5 mm to 30 mm, with 10 mm preferred, more preferably uniformly sized bubbles. The bubbles are preferably filled with air at atmospheric pressure, but may be filled with other gases, e.g. nitrogen, helium, argon, Sulfur hexafluoride, $C_4F_7N$, etc., having heat transfer characteristics, or at different atmospheric pressures, provided that the resulting bubbles are at least as effective as air.

As an example, the suit panels that comprise the back of the suit (which under normal utilization would be under water when floating), may be comprised of a double, triple or quadruple bubble layer 1206, instead of larger bubbles. Such a double panel would be stiffer, but would occur in an area of the suit where such stiffness is not a shortcoming. Again, although other suitable sizes may be used.

The CLO value reflects the degree of insulation provided by an article of clothing. A CLO value of 1 is equal to the amount of clothing required by a resting human to maintain thermal comfort at a room temperature of 21 degrees Celsius, or 71 degrees Fahrenheit (such as a business suit). A naked human has a CLO value of 0.0. Summer clothing has a CLO of 0.6. A downhill ski suit a CLO of 2.0, and a heavy polar gear suit a CLO of 4.0 (such as an Eskimo ensemble). The use of single or double (or more) bubble layers (as in a preferred embodiment example of 10 mm) creates a cold weather infant suit 100 with a high CLO value of 4.87. One with a triple layer of bubbles in the back (three successive layers of 10 mm bubbles) would have CLO of 6.18. A suit in accordance with an embodiment having 10 mm bubbles with a double layer in the back having a CLO of about 4.87 is still significantly higher that the regulation suit which has to be CLO 0.75.

In one embodiment, the suit begins as two layers, the internal liner 1204 which is sewn into the edges of the bubble layer 1206 in the form of panels with a pattern, in effect the traditional way of mass suit construction. Sewing around the edges is critical, for the minimal number of perforations to the bubble layer 1206 panels is desired. This results in a 'bubble' suit, which is a thermal envelope, but not waterproof. This thermal envelope is comprised of a central chamber 204 that is pneumatically connected to the head covering chamber.

One or more portions of said suit's exterior surface are equipped with mechanical or chemical attachment components along portions of said suit. These may be components such as Velcro™ placed at locations (i.e., Hooks and Loops or other similar mechanical attachment), chemical strips (glue/epoxy pads) or other similar components that will allow the inner thermal layer to be attached to the outer waterproof layer.

In one embodiment, an overlay for the bubble suit is then created by taking similar patterns to those of the bubble envelope and making a closely conforming outer suit (say 3% to 10% larger), cutting them from polyether film 1208 (or other similar flexible waterproof material), and welding the ends/edges (through ultrasonic welding or needle threads that are melted), in order to create a waterproof outer shell, that envelopes the bubble suit. The bubble suit has complementary attachment components to those placed on the exterior of the bubble at locations, but this time secured to the interior of the polyether film and placed within the interior of this impermeable shell.

The bubble envelope is then secured (via the complementary attachment component, e.g., Velcro™ or chemical strips or other structures) within the waterproof/impermeable shell, creating the first layer composite layer suit (Inner liner/bubble/polyether film). We note that the waterproof zippers/closures are attached to the shell, in effect, this shell with the inner bubble suit could be used. The main challenge, is that the film material 1208 can be easily worn out, cause water to come in. However, in one embodiment, something like a light neoprene or polyurethane layer can bonded to the outside of the film 1208, creating a simple suit. It should be understood that the aforementioned attachment may be permanent or not, depending on the attachment mechanism utilized, with non-permanent attachments, e.g., Velcro™ permitting replacement of a damaged component layer at needed.

In one embodiment, a more robust suit is accomplished, by creating another outer shell 108, also 3% to 10% larger, which also closely conforms and envelopes (through similar slightly larger patterns using a material like Nylon (such as 200 Denier Oxford Nylon 1210)) or other similar water-repellent, highly durable material. This layer need not be waterproof, but simply water-repellent, so that as the suit is immersed, the weight will not increase significantly, but will have a durable, wear proof exterior 'skin' 108 that protects against punctures/tears in the waterproof layer 1208.

Attachment components, e.g., Velcro™ (i.e., hooks and loops), are attached to the outside of the impermeable shell 1206/1212 at locations around the periphery, and to complementary similar location within the outer shell. Thus, the inner shell (already containing the bubble envelope) is inserted within the outer shell and attached at similar points through complementary components located within the outer shell. That is, the thermal 1206, waterproof 1206/1212 and outer layer 1210 are anchored at specific points, but able to slide relative to each other slightly. The outer shell has one or more openings (either open or covered with a mesh) to allow any water caught between the waterproof 1206/1212 and outer layer 1210 to exit.

The above composite, multilayer fabric structure would be suitable for use in clothing and other shelters, such as sleeping bags, tents, rafts, etc. A similar combination (where the bottom of the raft/tent/bag) is made of double or more layers of bubbles 1206, would result in a significantly insulating yet waterproof surface.

In other embodiments, the various layers, may be sewn, welded or otherwise suitably attached (including but not limited to other suitable mechanical and/or chemical means) together in various internal configurations (keeping the outer shell (made of something like Denier Oxford Nylon 1210 on the outside), to create a thermal protective layer that will preserve the wearer's/occupant's heat. While in many cases when immersed in water, small amounts of liquid may seep in, the ability to contain the heat within the enclosure, would ensure that the wearer remains in conditions that would be superior to the simple immersion without the suit or enclosure.

The advantage of the insulated central cavity, inner chamber or enclosure 204 within which the infant resides is evident when we envision a user residing within it as they potentially float within a body of low temperature or freezing water, on top of an ice floe, or even within a survival boat or raft exposed to the elements. In all these situations, a modicum of water may enter the internal cavity 204, either as a result of immersion and/or through wave action or ocean spray. Such fluid however will be quickly warmed by the user's body temperature, and become an integral part of the internal cavity 204 thermal ecosystem. Since such captured water is isolated from the outside water because of the insulating layers, it will remain warm at/near body temperature.

Once the inner lining layer 1204 (e.g., Ripstop nylon) is attached to the bubble material 1206, the shape of the suit 100 begins to take form as a thermal layer or bubble layered 1206/1212 form forming a cavity. The ripstop 1204 internal layer is what comes in contact with the user's body (being inside the suit), and is attached to the outer (at this stage) bubble layer 1206.

The suit's central cavity 204 and head 102 extensions form a single, pneumatically communicated chamber. The inner layer 1202 has two significant advantages. It facilitates the user sliding into the suit (something all but impossible to control with an infant with the bubble material 1206 surface against the skin), and also creates a composite that is insulating (the bubble material 1206) while strong in tension (and against ripping) due to the inner layer 1202. In one embodiment, an advantage of the composite, is that all the stitching is done around the edges, which are then folded inside the outermost layer, minimizing any stitching across the bubble layer 1206 to areas where water will not be able to come in through the stitches into the interior.

In one embodiment, the inner bubble shape is then enclosed within a polyether film 1208 cocoon or layer, which provides a waterproof/water-resistant layer, as well as further structural strength. When the splash guard 902 is deployed, the infant is protected from wind, rain, waves and unexpected dunking into the water.

The head area is important for providing adequate visibility/hearing to infant users, particularly in allowing them to see a reassuring or familiar face. However, an uncovered head is an area that loses a lot of heat. For this reason, a heat-retaining impermeable hood 102 is embodied, with a water-resistant shroud hood 110 is envisioned in one embodiment. By enclosing the majority of the user's head within a cap 102 (formed from the same composite fabric as the rest of the suit, particularly including heat resistant bubble layers 1206), we allow for the various size differences of infants, while physically and thermally covering the head. In another embodiment, the hood or cap fabric 102 has a double layer of bubble material 1206.

The frontal area (that around the face) is comprised of a flexible polychloroprene partial mask 110 for covering most of the face as the user finds comfortable. Materials such as Neoprene or other similar scuba fabrics are suitable. The partial mask 110 neoprene edge is attached to the hood 102 with cement or heat seal tape, sealing the area around it. Adjustment of the cap 102 to each user is accomplished by one or more straps 210 that allow cinching around the head, as well as adjustment to the size of the infant's head. This is critical since infant heads vary significantly in size.

In situations where a suit wearer may spend significant amounts of time immersed in water, the suit provides natural flotation (thanks to the inner chamber 204 natural buoyancy), but the user may not find having their face constantly splashed by water. We see a transparent tent or splash guard 902 surrounds the head cover 102. As shown, the user then may close all but a small opening 904 allowing them to see around them, and continue relaxed, without constant water immersion/splashing on their face. In one embodiment, small tubes are placed at the area around said small opening 904, to facilitate breathing.

Infants are less capable of moving their arms and legs than adults. As such, the infant suit has an inflatable head shroud 802, and side shrouds 804/806. These head and side shrouds 802/804/806 may be pneumatically connected (or separate), so that they may inflated individually or separately by the adult fitting it to the infant. The side shrouds 804/806 may be connected to each other via a Velcro™ or another removable mechanical link. When the suit is first donned, and the inner strap is loose, the user's body is contained within a sealed inner chamber comprised of the torso and head.

Figure 10:
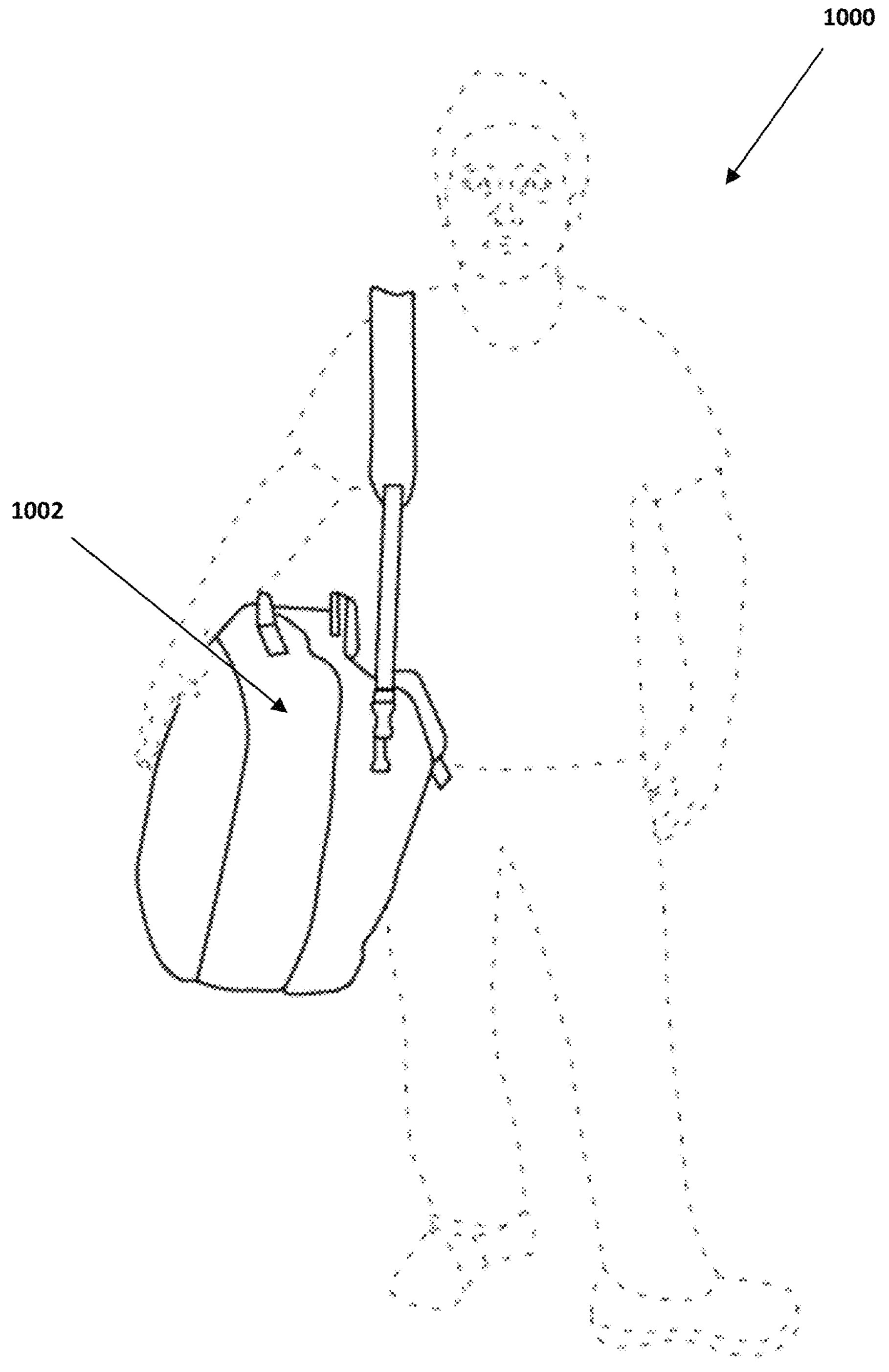
FIG. 10 shows a unit packed for use in relation to a human, according to an exemplary embodiment of the invention.

The complete unit may be then packed and kept ready for use 1000 (FIG. 10) within a compact bag 1002. In it, we can appreciate a critical advantage of using the smaller bubble material 1206 in that the resulting suit can be easily carried when folded properly, has lower manufacturing costs, while remaining highly usable. We note that the smaller bubble material reduces the weight of a similar dimensioned suit having larger bubbles of up to about 30 mm by up to 20%.

Figure 11:
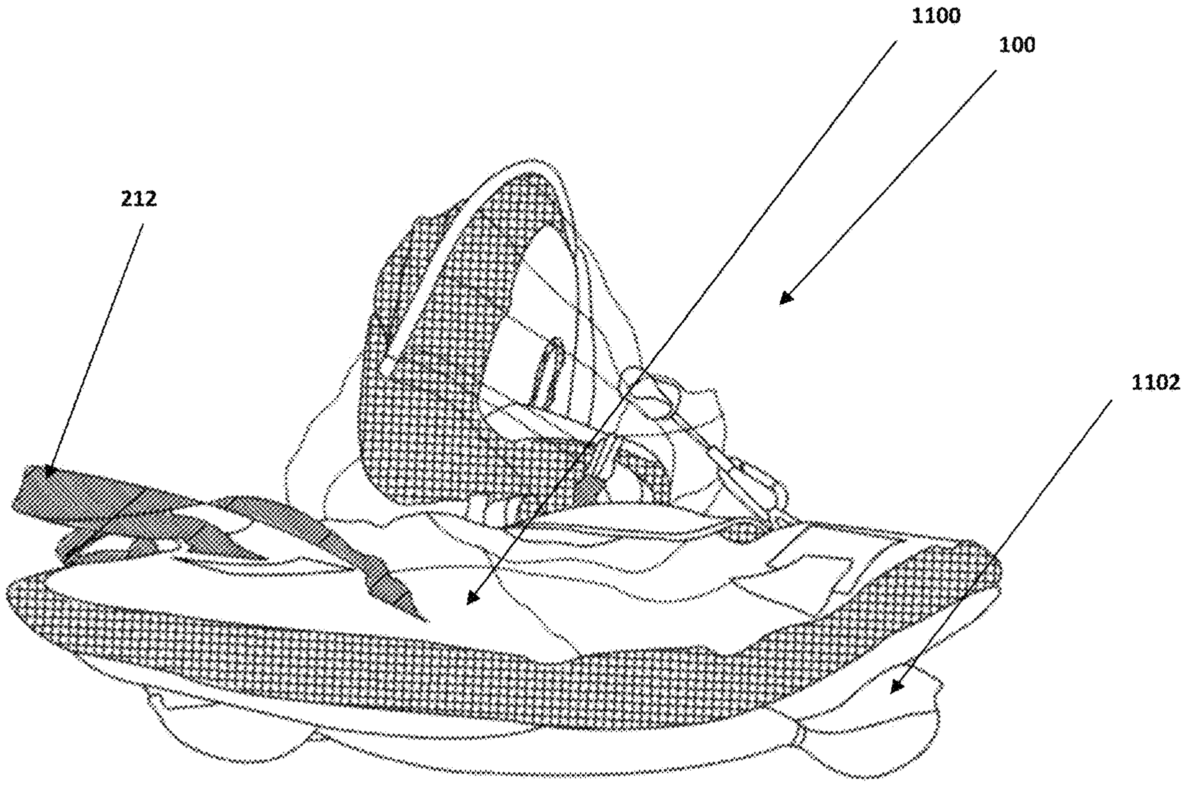
FIG. 11 shows a cold weather infant survival suit floating aids, according to an exemplary embodiment of the invention.

In FIG. 11, we see how unstable a tipped 1100 over unit 100 would be, thanks to the optional flotation aids 1102. In particular, the additional straps 212 show the availability for attachment/access by others. In addition, the large straps 212 allow for the deployed unit 100 to be worn as a backpack or papoose by the guardian or responsible adult for the child.

In another embodiment, the primary outer layer is comprised of an outer shell fabric that is optionally waterproof, water-resistant or water-repellent layer. A material such as Balloon Wide HST (Heal Seal Technology), 70D Nylon Ripstop with TPU (Polyurethane Coating) Backing may be used. This material can be obtained from suppliers such as the Brookwood Company. Such a material may be obtained in high-visibility colors or any other suitable color. In such an embodiment, one or more batting fabric layers (comprised of a suitable batting material such as the Polartec™ Power Fill 135, Style 8864, which may be obtained from a supplier like Polartec™), are sandwiched within the inner layer comprised of a material such as a lightweight and soft fabric such as Oxford or Ripstop. An optional mylar or other suitable reflective material, such as VIVOSUN Horticulture Highly Reflective Mylar Film R may be included between the inner layer and batting layer.

A batting layer may be comprised of a suitable batting material. A material such as the Polartec™ Power Fill 135, Style 8864, which may be obtained from a supplier like Polartec™. A lining fabric layer may be comprised of a material such as a lightweight, soft fabric such as Oxford or Ripstop. It may be used to sew the layers together, giving the seam more strength, to slide into the garment easier, and to have a better finish. An optional mylar or other suitable reflective material, such as VIVOSUN Horticulture Highly Reflective Mylar Film R may be included. Another optional material may be comprised of a suitable contained-air (sometimes called bubble wrap) material, such as Temp-Shield™ Bubbles Foil/White, Radiant Foil, Style TS-SBFW-48, obtainable from a supplier such as Radiant Foil.

In another embodiment, an alternative to be used in conjunction with SHELL, LINING layers is Aerogel, either alone or with contained-air layer and or Mylar. This Aerogel layer can be any thickness and as an example can be supplied by Cabot. Thermal Wrap™ aerogel blankets from Cabot provide the insulating properties of silica aerogel in a flexible form that is virtually dust-free. It is known for use in engineering projects involving ambient and sub-ambient insulating applications, and more. It is easy to cut and handle, and is useful as a translucent fabric for daylighting and acoustic damping in buildings. Thermal conductivity is ~23 mW m−1 K−1 at room temperature. It is an alternative to Spaceloft® or Cryogel® for dust-sensitive applications. Operating temperature of −200° C. to 125° C. with 160° C. peaks.

CONCLUSION

In concluding the detailed description, it should be noted that it would be obvious to those skilled in the art that many variations and modifications can be made to the shown embodiments without substantially departing from the principles of the present invention. Also, such variations and modifications are intended to be included herein within the scope of the present invention as set forth in the disclosure.

It should be emphasized that the above-described embodiments of the present invention, particularly any "exemplary embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention.

The invention claimed is:

1. A flexible cold weather infant survival suit for a user comprising:

a first inner thermal layer forming a central cavity pneumatically connected to a head covering having a face opening, wherein said thermal layer cavity includes one or more attachment components at various locations of said thermal layer's exterior;

wherein said thermal layer comprises an internal lining layer and a thermally insulating bubble layer attached together, wherein said thermal layer bubbles are comprised of similar sized bubbles that have a diameter of between 5 mm and 30 mm and a height of 3 mm to 6 mm;

a second waterproof layer dimensioned to envelop said inner thermal layer, said waterproof layer including one or more internal attachment components complementary to said thermal layer's attachment components, so as to couple said waterproof layer together to said inner thermal layer;

wherein said waterproof layer is formed from a waterproof material, including a flexible hood having a seal around the user's face area of said thermal layer's head covering;

said second layer has one or more front opening/closing mechanical components for sealing the interior of said second layer, including said thermal cavity; and said enclosure has a stabilizing wing at the back and upper end.

2. The infant survival suit of claim 1 wherein:

said central cavity is equipped with infant securing components, including at least one of:

strap, seat, pet restraining hook and/or belt.

3. The infant survival suit of claim 2 wherein: said internal lining materials are comprised of one or more of:

ripstop fabric, ripstop nylon, high modulus polyethylene (HMPE)®, silnylon or nylon;
said thermally insulating materials are comprised of one or more of:
bubble layer, bubble layer with foil, radiant foil or aerogel;
and said waterproof layer materials are comprised of one or more of:
plastic film, polyether film or polyurethane.

4. The infant survival suit of claim 3 wherein:
an inflatable head shroud is located around the head opening area.

5. The infant survival suit of claim 4 wherein:
said stabilizing wing has two underside extensions; and
one or more straps are placed for ease of holding onto said suit.

6. The infant survival suit of claim 5 wherein:
said bubble layers include aluminized layers on their exteriors.

7. The infant survival suit of claim 1 further comprising:
one or more attachment components added to the exterior of said waterproof layer;
a third protective outer layer enveloping said waterproof layer, said outer layer including internal attachment components complementary to said waterproof's layer external attachment components, so as to couple said outer layer to said waterproof layer; and
wherein said outer layer is formed from one or more materials, including wear resistant fibers and mechanical closure components.

8. The infant survival suit of claim 7 further comprising:
one or more attachment components added to the exterior of said waterproof layer;
a third protective outer layer enveloping said waterproof layer, said outer layer including internal attachment components complementary to said waterproof's layer external attachment components, so as to couple said outer layer to said waterproof layer; and
wherein said outer layer is formed from one or more materials, including wear resistant fibers and mechanical closure components.

9. The infant survival suit of claim 8 further comprising:
said central cavity is equipped with infant securing components, including at least one of:
strap, seat, pet restraining hook and/or belt.

10. The infant survival suit of claim 9 wherein:
said internal lining materials are comprised of one or more of:
ripstop fabric, ripstop nylon, Dyneema®, silnylon or cordura;
said thermally insulating materials are comprised of one or more of:
bubble layer, bubble layer with foil, radiant foil or aerogel;
said waterproof layer materials are comprised of one or more of:
plastic film, polyether film, neoprene or polyurethane; and
said outer layer materials are comprised of one or more of:
Nylon, Denier Oxford Nylon, plastic or water-repellent fibers.

11. The infant survival suit of claim 10 wherein:
an inflatable head shroud is located around the head opening area.

12. The infant survival suit of claim 11 wherein:
said stabilizing wing has two underside extensions; and
one or more straps are placed for ease of holding onto said suit.

13. The infant survival suit of claim 12 wherein:
said bubble layers include aluminized layers on their exteriors.

* * * * *